(12) United States Patent
Deguchi et al.

(10) Patent No.: US 7,787,218 B2
(45) Date of Patent: Aug. 31, 2010

(54) DATA STORAGE DEVICE

(75) Inventors: Takaaki Deguchi, Kanagawa (JP); Mutsuro Ohta, Kanagawa (JP); Shingo Tsuda, Kanagawa (JP); Taichi Nakamura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 844 days.

(21) Appl. No.: 11/707,534

(22) Filed: Feb. 16, 2007

(65) Prior Publication Data
US 2007/0206331 A1 Sep. 6, 2007

(30) Foreign Application Priority Data
Mar. 6, 2006 (JP) ............... 2006-060045

(51) Int. Cl.
*G11B 5/54* (2006.01)
(52) U.S. Cl. ..................................... 360/255
(58) Field of Classification Search ............. 360/255, 360/244.2, 254.7, 254.8, 245.7, 245.3; 720/676
See application file for complete search history.

(56) References Cited

U.S. PATENT DOCUMENTS

| | | | | |
|---|---|---|---|---|
| 5,446,611 | A * | 8/1995 | Webber | 360/245 |
| 6,151,197 | A * | 11/2000 | Larson et al. | 360/255 |
| 6,307,716 | B1 | 10/2001 | Hamaguchi et al. | |
| 6,867,939 | B2 * | 3/2005 | Katahara et al. | 360/53 |
| 7,365,945 | B2 * | 4/2008 | Fujimoto et al. | 360/255 |
| 7,450,347 | B2 * | 11/2008 | Suzuki et al. | 360/255 |
| 7,609,483 | B2 * | 10/2009 | Deguchi et al. | 360/254.7 |
| 2003/0193752 | A1 * | 10/2003 | Takahashi et al. | 360/245.3 |
| 2005/0030671 | A1 | 2/2005 | Lee et al. | |
| 2005/0047021 | A1 | 3/2005 | Kim et al. | |
| 2005/0174694 | A1 * | 8/2005 | Erpelding | 360/244.8 |

FOREIGN PATENT DOCUMENTS

| | | |
|---|---|---|
| JP | 08-221922 | 8/1996 |
| JP | 11-250603 | 9/1999 |
| JP | 2005-011511 | 1/2005 |
| JP | 2005-071588 | 3/2005 |

* cited by examiner

*Primary Examiner*—Allen T Cao
(74) *Attorney, Agent, or Firm*—Townsend & Townsend; John Henkhaus

(57) ABSTRACT

Embodiments in accordance with the present invention relate to suppressing deterioration in rigidity and dynamic characteristics of a tab even when an initial point of contact between a tab and a ramp during unloading is set closer to the outer periphery of a disk. A data storage device in one embodiment of the present invention includes a head, a ramp for unloading the head, a load beam having a head support portion for supporting the head and a tab adapted to slide on a sliding surface of the ramp on a front end side with respect to the head support portion, and an actuator having the load beam and adapted to actuate the head for loading and unloading. During unloading, a portion of the tab offset from the center in the transverse direction of the tab first comes into contact with the sliding surface of the ramp. The load beam has a flange formed to be bent and continuously from the front end portion of the tab up to both ends of the head support portion.

17 Claims, 9 Drawing Sheets

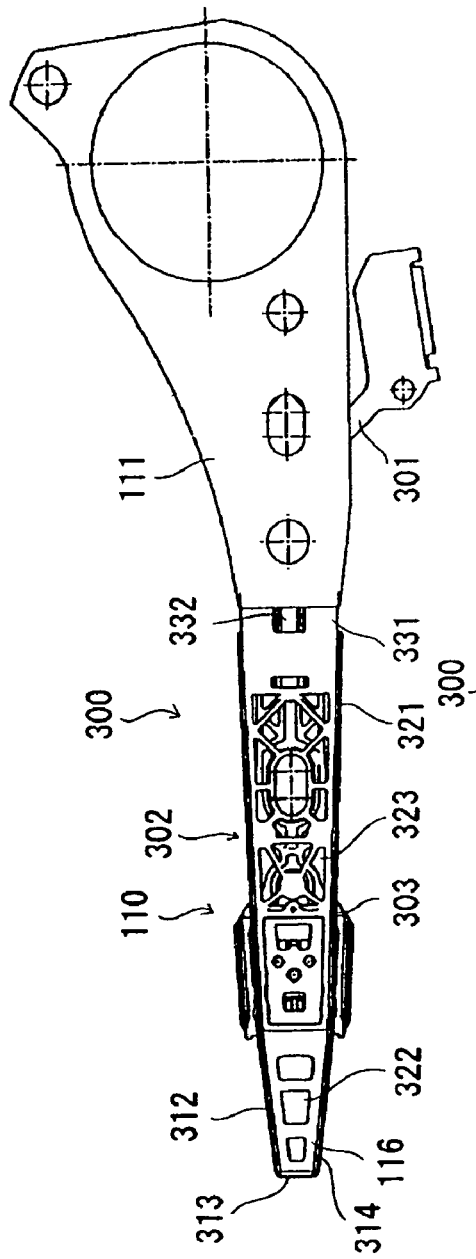
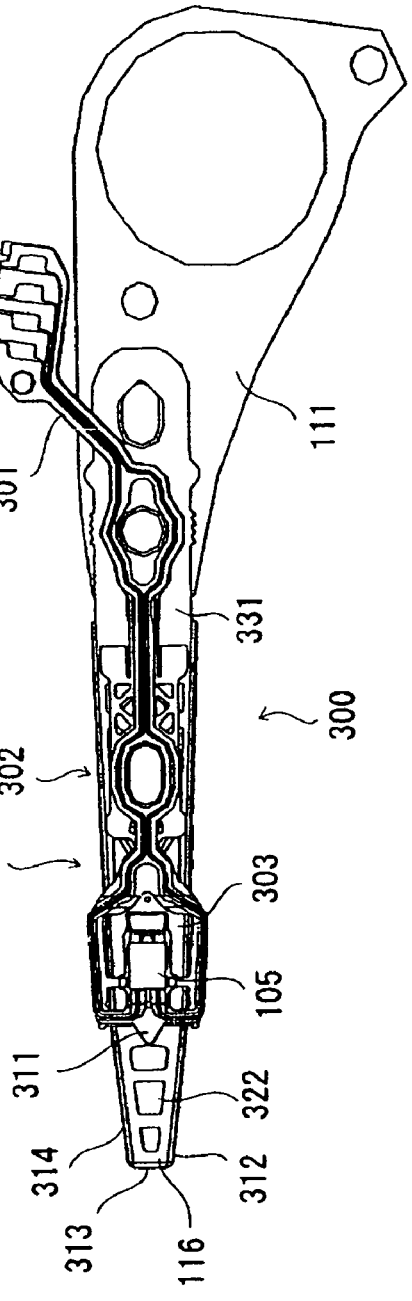
Fig. 3(a)
Fig. 3(b)
Fig. 3(c)

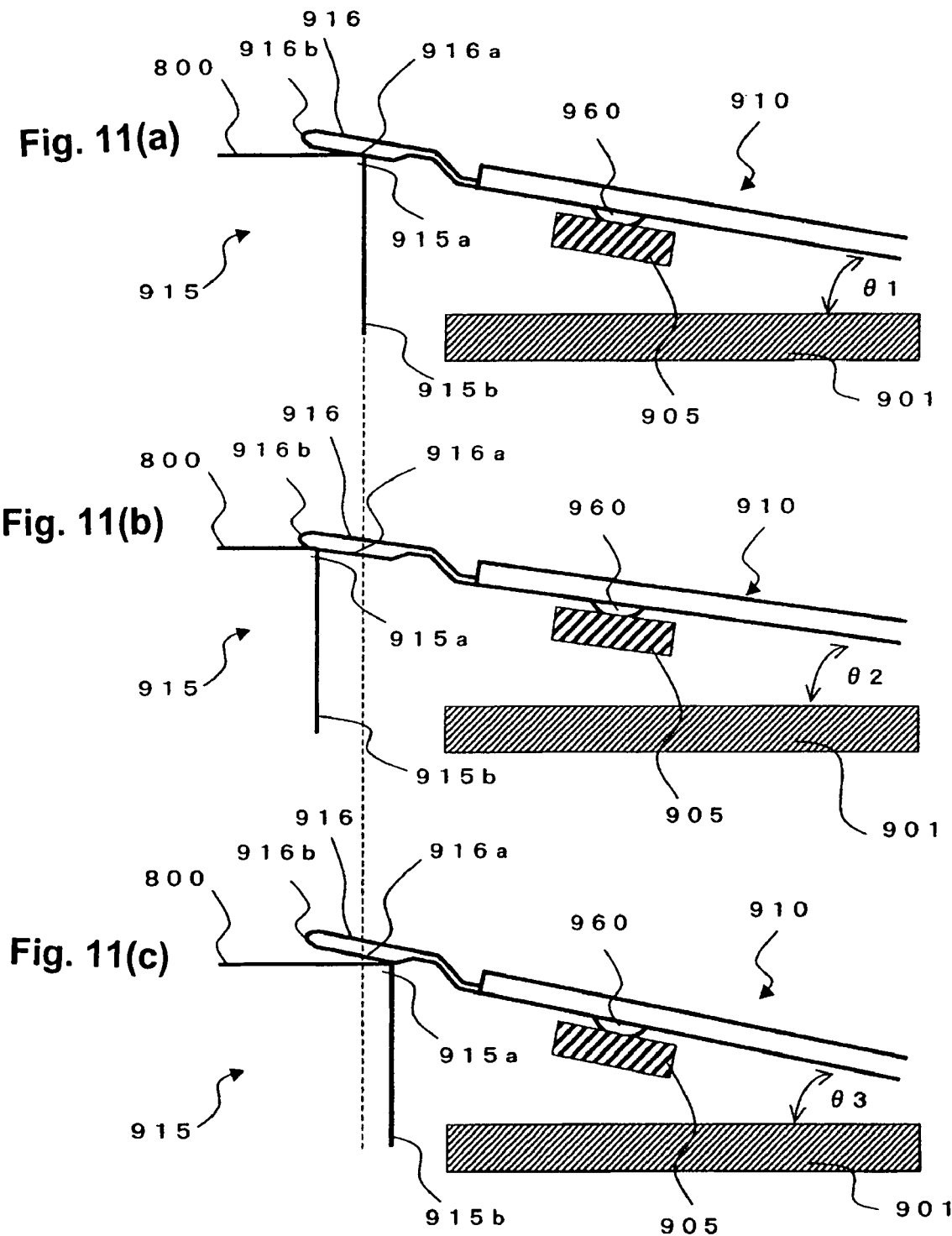

DATA STORAGE DEVICE

CROSS-REFERENCE TO RELATED APPLICATION

The instant nonprovisional patent application claims priority to Japanese Patent Application 2006-060045, filed Mar. 6, 2006 and incorporated by reference in its entirety herein for all purposes.

BACKGROUND OF THE INVENTION

The devices using an optical disk, a magnetic tape, or other forms of media are known as data storage devices. Among them, a hard disk drive (HDD) is commonly used as a storage device for a computer, and the HDD is one of storage devices essential for computer systems which are currently used. In addition, the use of the HDD are not only limited to computer systems but also has widely expanded because of the superior characteristics. The HDDs are used, for example, for moving picture recording/reproducing devices, car navigation systems, cellular phones, removable memories used for digital cameras and the like.

The HDD is provided with a magnetic disk for storing data and a head for writing and/or reading out data to/from the magnetic disk. The head has a head element portion which is a thin film element and a slider with the head element portion disposed on its surface. The head element portion has a write element portion which converts an electric signal into a magnetic field in accordance with data to be recorded onto the magnetic disk and a read element portion which converts a magnetic field provided from the magnetic disk into an electric signal. Typically, the write element portion and the read element portion are formed integrally in one thin film element.

The HDD is further provided with an actuator for moving the head to a desired position over the magnetic disk. The actuator is driven by a voice coil motor (VCM) and is adapted to pivot about a pivot shaft, thereby moving the head radially over the magnetic disk which is rotating. With this movement, the head accesses to a desired track formed on the magnetic disk, whereby it is possible to read or write data.

The loading/unloading type HDD is provided with a ramp for retraction of the head from above the surface of the magnetic disk. The ramp is disposed in proximity to an outer periphery end of the magnetic disk. When the rotation of the magnetic disk stops, the head is attracted to the disk surface. To avoid this inconvenience, when the rotation of the magnetic disk stops, the actuator causes the head to be retracted to the ramp from the recording surface of the magnetic disk.

The actuator has a suspension and an arm for supporting the head. A tab is provided at a front end portion of the suspension. As the tab is guided to the ramp, the head retracts to the outside from above the surface of the magnetic disk and thus unloading is performed. Conversely, as the tab leaves the ramp, the head moves from the outside of the magnetic disk to a position above the disk surface and thus loading is performed.

FIG. 9 is a side view of a load beam 910 provided at a front end portion of a suspension, which is used in a conventional HDD. FIG. 9 shows the state of the load beam 910 with a head 905 positioned over a magnetic disk 901.

As shown in the same figure, the head 905 is supported at one point by a dimple 960 provided on the load beam 910 and is flying at a predetermined height over a surface of the magnetic disk 901. A tab 916 is bent and extends away from the magnetic disk 901 from a front end of the load beam 910. That is, over the magnetic disk 901, the tab 916 is formed so as to be higher than a head support portion 961 of the load beam 910. In particular, the tab 916 extends in the same direction as the extending direction of the load beam 910 (head support portion 961). In other words, in a state in which the head 905 flies over the magnetic disk 901, the inclination of the load beam 910 (head support portion 961) and that of the tab 916 relative to the surface of the magnetic disk 901 are almost the same.

FIG. 10 shows loading and unloading conditions as seen from the front end side of the conventional load beam 910 and FIG. 11 shows loading and unloading conditions as seen from a side face of the conventional load beam 910.

During unloading, as shown in FIG. 10, the tab 916 slides on a sliding surface 800 of a ramp 915, thereby lifting the load beam 910 up to a predetermined height and separating the head 905 from the magnetic disk 901. At this time, the tab 916 first comes into contact with a magnetic disk-side inclined surface 801 of the sliding surface 800 and slides thereon and rises up to a maximum lift surface 802. In the same figure, the numeral 901a represents a position at which the tab 916 first comes into contact with the slant face 801 of the magnetic disk and numeral 901b represents a position at which the tab 916 is required to be lifted up to separate the head 905 from the magnetic disk 901. The height H in the figure represents a lift quantity for lift up to the height necessary for separation of the head 905 from the magnetic disk 901.

During loading or unloading, as shown in FIG. 11, a corner 915a of the sliding surface of the ramp 915 and part of an abdominal surface 916a of the tab 916 come into contact with each other, while a front end 916b of the tab 916 is away from the sliding surface 800. The position and size of the ramp 915 vary due to a mechanical error. Here, only errors of the ramp mounting position (in the direction of the suspension pivot shaft) are considered without considering errors in the ramp height direction. For example, errors of the ramp mounting position include an actuator mounting error and a ramp mounting error.

FIG. 11(a) shows the case where there is no mounting position error of the ramp 915, FIG. 11(b) shows the case where a side face 915b on the load beam 910 side of the ramp 915 is close to the load beam 910, and FIG. 11(c) shows the case where the side face 915b on the load beam 910 side of the ramp 915 is distant from the load beam 910.

In FIG. 11(a), the corner 915a of the ramp 915 and a portion near the center of the abdominal surface 916a of the tab 916 are in contact with each other. In FIG. 11(b), the corner 915a of the ramp 915 and the front end side of the abdominal surface 916a of the tab 916 are in contact with each other because the side face 915b of the ramp 915 is distant from the load beam 910. In FIG. 11(c), the corner 915b of the ramp 915 and the root side of the abdominal surface 916a of the tab 916 are in contact with each other because the side face 915b of the ramp 915 is close to the load beam 910. That is, the point of contact between the ramp 915 and the tab 916 is the position of the corner 915a and the position of contact between the ramp 915 and the tab 916 differs due to an error of the mounting position of the ramp 915. Therefore, taking the error of the mounting position of the ramp 915 into account, the tab 916 is required to have such a length to reach the ramp 915 even at the farthest position of the ramp from the load beam.

Taking into account the inclination of the load beam 910 relative to the magnetic disk 901 in a lifted state of the load beam, it is assumed that the inclination of the load beam 910 in FIG. 11(a) is θ1, the inclination of the load beam 910 in FIG. 11(b) is θ2, and the inclination of the load beam 910 in FIG. 11(c) is θ3. As a result, the position of contact between the tab 916 and the ramp 519, i.e., the position at which the tab 916 is lifted, differs in the respective cases and the relationship of θ2<θ1<θ3 is established.

If the inclination of the load beam 910 during loading and unloading varies due to an error of the mounting position of the ramp 915, the position (901b in FIG. 10) at which the head 905 is separated from the magnetic disk 901 varies during unloading. For example, as shown in FIG. 11(b), if the inclination of the load beam 910 is small because the corner 915a of the ramp 915 is distant from the load beam, the position at which the head is separated during unloading becomes distant from the center of the magnetic disk. As shown in FIG. 11(c), if the inclination of the load beam 910 is large because the corner 915a of the ramp 915 is close to the load beam, the position at which the head is separated during unloading becomes close to the center of the magnetic disk.

Thus, the range of the recording area of the magnetic disk is determined by the position 901b at which the head is separated, so if the position 901b changes due to an error of the mounting position of the ramp 915, the recording area of the magnetic disk also changes. Therefore, also as to the recording area of the magnetic disk, it is necessary to take an error of the ramp mounting position into account and establish, as an effective recording area, a range of a narrow recording area wherein the ramp is the closest to the load beam.

To lift the load beam up to a required height to ensure the recording area of the disk irrespective of an error of the ramp mounting position, it is necessary to heighten the ramp. However, such an increased height of the ramp becomes a restriction on the thickness of the magnetic disk drive. Moreover, since the length from the point of contact between the tab and the ramp up to the front end of the tab varies due to an error of the ramp mounting position, the height up to the front end of the tab is not constant in the state where the tab and the ramp are in contact with each other. Therefore, as shown in FIG. 11(c), it is necessary to take into account the case where the ramp and the root side of the tab are put in contact with each other. This also becomes a restriction on the thickness of the magnetic disk drive.

In Patent Literature 1 (Japanese Patent Laid-Open No. 2005-71588), a projecting portion for contact with a ramp is formed at a front end of a tab in order to decrease the contact area between the tab and the ramp. However, this does not intend to increase the memory capacity of a magnetic disk or reduce the thickness of a magnetic disk drive. Besides, since the tab described in Patent Literature 1 extends as a plate tab to a front end of a load beam, it is apt to deflect upon contact of its projecting portion with the ramp, thus giving rise to a problem in point of rigidity of the tab.

Further, as shown in FIG. 10, the width of the conventional tab 916 is smaller than that of the head support portion 961 of the load beam 910. The conventional tab 916 extends from the center of the front end of the load beam 910 so as to be U-shaped cross-sectionally in the transverse direction (this is also the case with Patent Literature 2 (Japanese Patent Laid-Open No. 2005-11511)). Consequently, during unloading, the magnetic disk-side inclined surface 801 of the ramp 915 and the center of the tab 916, i.e., the center of the load beam 910, come into contact with each other. For example, there is the case where the position of the head 905 upon initial contact between the tab 916 and the ramp 915 during unloading is to be set on the central side of the magnetic disk or the case where the contact point 901a between the tab 916 and the ramp 915 is to be set closer to the outer periphery of the magnetic disk.

In this case, conventionally, the tab 916 is provided asymmetrically with respect to the center in the transverse direction of the load beam 910. Alternatively, as in Patent Literature 3 (Japanese Patent Laid-Open No. 11-250603), the point of contact between the tab and the ramp is rendered oblique relative to a central axis of a suspension. If the tab is formed asymmetrically or the point of contact between the tab and the ramp is rendered oblique, a large vibration occurs due to a twist during loading or unloading, thus resulting in that dynamic characteristics of the suspension including the load beam are deteriorated markedly.

In Patent Literature 4 (Japanese Patent Laid-Open Publication No. 8-221922), a front end of a suspension is symmetric and a flange portion is provided in part of the outer periphery of the front end of the suspension, which flange portion is put in contact with a ramp (lift portion). In this case, since the flange portion is provided only at the portion to be contacted with the ramp, it is impossible to prevent vibration caused by a twist during loading or unloading.

Thus in the conventional HDD, the head support portion of the load beam and the tab extend in the same direction and a corner of the ramp and the abdominal surface of the tab come into contact with each other at the time of loading or unloading. Therefore, the tab length and the recording area of the magnetic disk obtain restrictions due to an error of the ramp mounting position, thus giving rise to the problem that it is difficult to increase the memory capacity of the magnetic disk or reduce the thickness of the magnetic disk drive.

Moreover, in the conventional HDD, when the initial point of contact with the tab and the ramp during unloading is set outside the disk, the tab is made asymmetric, or the point of contact with the tab and the ramp is made oblique, or a flange portion is provided only at the portion of contact with the ramp, thus giving rise to the problem that the rigidity of the tab and dynamic characteristics of the suspension are deteriorated.

BRIEF SUMMARY OF THE INVENTION

Embodiments in accordance with the present invention relate to suppressing the deterioration in rigidity and dynamic characteristics of a tab is to be suppressed even when an initial point of contact between a tab and a ramp during unloading is set closer to the outer periphery of a disk. Referring to the specific embodiments shown in FIGS. 1 and 3(a)-(c), a data storage device includes a head 105, a ramp 115 for unloading the head 105, a load beam 302 having a head support portion 302a for supporting the head 105 and a tab 116 adapted to slide on a sliding surface of the ramp 115 on a front end side with respect to the head support portion 302a, and an actuator 106 having the load beam 302 and adapted to actuate the head 105 for loading and unloading. During unloading, a portion of the tab 116 offset from the center in the transverse direction of the tab first comes into contact with the sliding surface of the ramp 115. The load beam 302 has a flange formed to be bent and continuously from the front end portion of the tab up to both ends of the head support portion.

For a more complete understanding of the present invention, reference is made to the following detailed description taken in conjunction with the accompanying drawings.

BRIEF DESCRIPTION OF THE DRAWINGS

FIGS. 3(a)-(c) are exemplary diagrams showing the construction of a head suspension assembly and that of an arm according to an embodiment of the present invention.

FIGS. 11(a)-(c) are exemplary diagrams showing loading and unloading conditions of a conventional tab and head.

Figure 1:
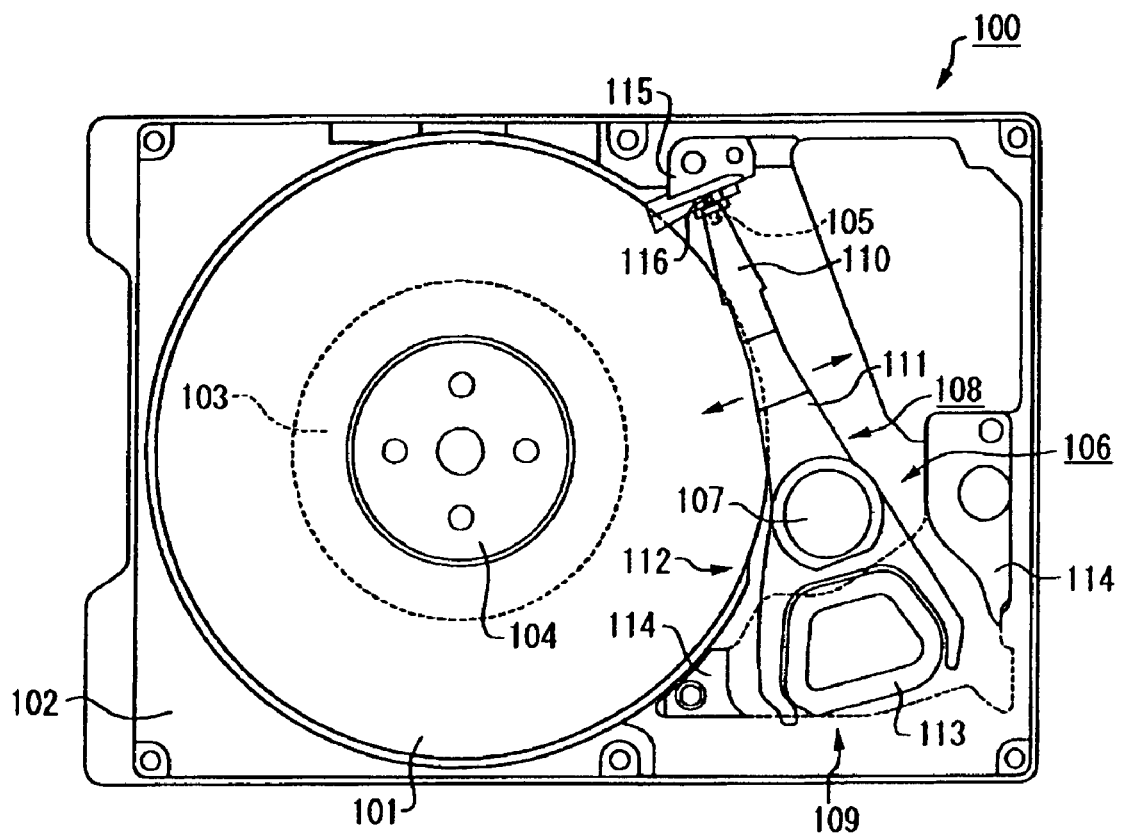
FIG. 1 is an exemplary diagram showing a schematic construction of a hard disk drive according to an embodiment of the present invention.

DETAILED DESCRIPTION OF THE INVENTION.

Embodiments in accordance with the present invention relate to a suspension and a data storage device using the same. More specifically, embodiments of the present invention relate to a suspension and a data storage device both suitable for a loading/unloading type hard disk drive.

It is an object of an embodiment of the present invention to reduce the influence of an error of the ramp mounting position in connection with the length of a tab and a recording area of a disk and thereby make it possible to increase the memory capacity and reduce the thickness of a disk drive. It is another object of an embodiment of the present invention to suppress deterioration of the tab rigidity and of dynamic characteristics even in the case where the initial point of contact between the tab and the ramp during unloading is set closer to the outer periphery of the disk.

In one embodiment of the present invention, a data storage device comprises a head adapted to access a recording area of a medium, a ramp having an unloading position to which the head is unloaded from a surface of the medium, and an actuator adapted to pivot about a pivot shaft to unload the head to the unloading position and load the head to a position above the surface of the medium from the unloading position. The actuator includes a load beam, the load beam including a head support portion for supporting the head and a tab provided on the side opposite to the pivot shaft with respect to the head support portion and adapted to come into contact with the ramp. The load beam further includes a flange formed to be bent and continuous from a front end of the tab up to both ends in the pivotal direction of the head support portion, and a portion offset from the center of the tab in the pivotal direction comes into contact with a inclined surface of the ramp. According to this data storage device, the initial point of contact between the tab and the ramp during unloading is set closer to the outer periphery of the disk and it is possible to suppress deterioration of the tab rigidity and of dynamic characteristics.

In the above data storage device, the head may include a slider having a head element portion, and the size in the pivotal direction of the tab may be larger than the size in the pivotal direction of the slider. According to this construction, the initial point of contact between the tab and the ramp during unloading can be set closer to the outer periphery of the recording medium.

In another embodiment of the present invention, a data storage device comprises a head adapted to access a recording area of a medium, a ramp having an unloading position to which the head is unloaded from a surface of the medium, and an actuator adapted to pivot about a pivot shaft to unload the head to the unloading position and load the head to a position above the surface of the medium from the unloading position. The actuator includes a load beam, the load beam including a head support portion for supporting the head and a tab provided on the side opposite to the pivot shaft with respect to the head support portion and adapted to come into contact with the ramp. The load beam further includes a flange formed to be bent and continuous from a front end of the tab up to both ends in the pivotal direction of the head support portion. A portion of the tab positioned outside the head in the pivotal direction comes into contact with a inclined surface of the ramp, whereby it is possible to shorten the tab and enhance the rigidity of the tab.

In the above embodiment of a data storage device, the center of the tab in the pivotal direction and the center of the tab-side end of the head support portion may be coincided with each other, whereby it is possible to suppress deterioration of the tab rigidity and of dynamic characteristics.

In the above embodiment of a data storage device, the portion of the tab located near the head support portion may be of the same width as the head support portion and the front end of the tab may be narrower than the vicinity of the head support portion. According to this construction, it is possible to reduce the weight of the tab and improve the impact resistance.

In the above embodiment of a data storage device, the tab and the head support portion may be formed contiguously and, in the contiguous portion, the size of the tab and that of the head support portion in the pivotal direction may be the same. According to this construction the initial point of contact between the tab and the ramp during unloading can be set closer to the outer periphery of the medium.

In the above embodiment of a data storage device, the front end of the tab may come into contact with the ramp. According to this construction it is possible to diminish the influence of an error of the ramp mounting position.

In the above embodiment of a data storage device, when the tab is in contact with the ramp, the other portion than the front end of the tab may be spaced away from the ramp. This makes it possible to diminish the influence of an error of the ramp mounting position.

In the above embodiment of a data storage device, in the state in which the tab is positioned above the surface of the medium, the tab may extend to the medium side with respect to the head support portion. According to this construction it is possible to diminish the influence of an error of the ramp mounting position.

In the above embodiment of a data storage device, when the tab is in contact with the ramp, the height from the point of contact between the tab and the ramp to the surface of the medium may be smaller than the height from a portion of the head support portion farthest from the surface of the medium to the surface of the medium. According to this construction it is possible to diminish the influence of an error of the ramp mounting position.

According to embodiments of the present invention, in connection with the length of the tab and the recording area of the disk, it is possible to diminish the influence of an error of the ramp mounting position and attain an increase of the memory capacity and reduction in thickness of the disk drive. Alternatively, according to the present invention, even in the case where the initial point of contact between the tab and the ramp is set closer to the outer periphery of the disk, it is possible to suppress deterioration of the tab rigidity and of dynamic characteristics.

An embodiment to which the present invention is applicable will be described below. The following description explains an embodiment of the present invention and the present invention is not limited to the following embodiment. To clarify the explanation, well known features are omitted or simplified as necessary in the following description and the drawings. Further, elements used in the following embodiment may be easily modified, added or changed by those skilled in the art in the scope of the present invention. In the drawings, the same elements are identified by the same reference numerals, and for the clarifying of explanation, duplicated explanations are omitted as necessary.

FIG. 1 is a diagram showing a schematic configuration of a hard disk drive (HDD) 100 according to this embodiment. FIG. 1 shows the state of the HDD 100 wherein an actuator lies in its operating position. A magnetic disk 101 used as an example of a medium. is a non-volatile recording disk, which stores data by magnetizing a magnetic layer. A cover (not shown) which covers an upper opening of the base 102 is fixed to the base 102 through a gasket (not shown)to thereby constitute a disk enclosure, resulting in allowing the components of the HDD 100 to be accommodated herein in a hermetically sealed state.

A clamp 104 fixes the magnetic disk 101 to a spindle motor 103. The magnetic disk 101 is rotated at a predetermined angular velocity (speed) by a spindle motor 103 which is fixed to a bottom of the base 102. When the HDD 100 is not in operation, the magnetic disk 101 remains stationary. A head 105 accesses a recording area of the magnetic disk. The head 105 has a head element portion and a slider to which the head element portion is fixed. The head element portion is integrally formed with a write head portion and a read head portion. The write head portion converts an electric signal into a magnetic field in accordance with data to be stored onto the magnetic disk 101. The read head portion converts a magnetic field provided from the magnetic disk 101 into an electric signal. The write head portion and the read head portion may be formed separately. The present invention is also applicable to a HDD having either one of the write head portion and the read head portion.

An actuator 106 holds and moves the head. In FIG. 1, the actuator 106 is held pivotably by a pivot shaft 107 and it includes a carriage 108 and a VCM (Voice Coil Motor) 109 as a drive mechanism. The carriage 108 includes such constituent members as a suspension 110, an arm 111 and a coil support 112 which are connected in this order from a front end portion of the carriage where the head 105 is disposed.

For the construction of the suspension 110, a detailed description will be given later. From the standpoint of dynamic characteristics, it is preferable that the mass of the suspension 110 be symmetric with respect to a line connecting the axis of the pivot shaft with the slider of the head 105. From the standpoint of diminishing a torsional vibration, it is preferable that an outline of the arm 111 be symmetric with respect to a line connecting the pivot shaft axis of the arm 111 with the slider of the head 105.

The coil support 112 holds a flat coil 113. An upper stator magnet holding plate 114 is fixed to the base 102 and sandwiches the flat coil 113 in between the upper stator magnet holding plate 114 and a lower stator magnet holding plate (not shown).

A ramp 115 has an unloading position for unloading the head 105 from above a recording surface of the magnetic disk 101 when the rotation of the magnetic disk 101 stops. A tab 116 is formed at a front end portion of the suspension 110. The ramp 115 is close to an outer periphery end of the magnetic disk 101. The tab 116 is secured to the bottom or a side face of the base 102 by a support rod which is located at a position offset from a movement path of the tab.

According to a drive signal supplied to the flat coil 113 from a controller (not shown), the VCM 109 causes the carriage 108 to move pivotally about the pivot shaft 107 and causes the head 105 to move onto the recording surface of the magnetic disk 101. Alternatively, the VCM 109 may cause the head 105 move onto the ramp 115 from above the recording surface of the magnetic disk 101.

To read or write of data from or to the magnetic disk 101, the actuator 106 moves the head 105 onto a data area on the surface of the magnetic disk 101 which is rotating. With pivoting of the actuator 106, the head 105 moves in the radial direction of the recording surface of the magnetic disk 101, whereby the head 105 may access a desired track. The head 105 flies over the magnetic disk with a certain gap by balancing a force created on ABS (Air Bearing Surface) of the slider opposed to the magnetic disk 101 with a pressing force of the suspension 110.

When the rotation of the magnetic disk 101 stops, the head 105 comes into contact with and is attracted by the surface of the magnetic disk 101, resulting in that the data area may be damaged at the time of the contact or at the time of releasing the head from the attracted state or the magnetic disk 101 may be incapable of rotation due to the attraction. Therefore, when the rotation of the magnetic disk 101 stops, the actuator 106 unloads the head 105 from the data area onto a sliding surface of the ramp 115. More specifically, the actuator 106 pivots toward the ramp 115, so that the tab 116 moves while sliding on the sliding surface of the ramp 115 and rests on a parking surface (stop surface) of the ramp, whereby the head 105 is unloaded. During loading, the actuator 106 supported by the parking surface leaves the ramp 115 and moves to a position above the magnetic disk 101.

Figure 2:
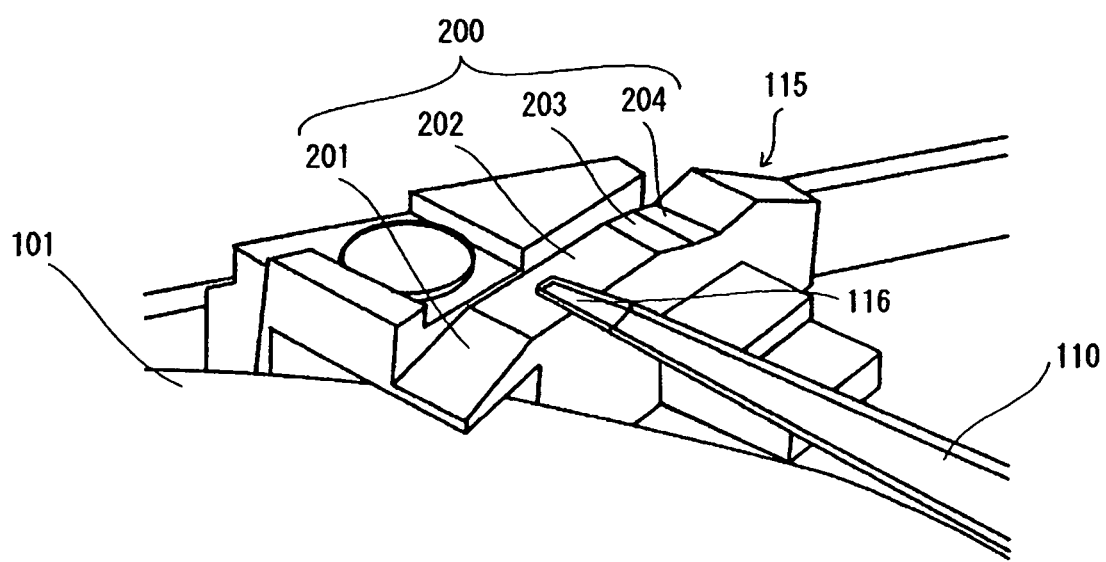
FIG. 2 is an exemplary perspective view showing loading and unloading conditions of a ramp and a tab according to an embodiment of the present invention.

FIG. 2 is a perspective view showing the state of the suspension 110 and the tab 116 formed at the front end portion of the suspension during loading and unloading conditions. A sliding surface 200 of the ramp 115 is constituted by a plurality of continuous surfaces, including a magnetic disk-side inclined surface 201, a maximum lift surface 202, a parking-side inclined surface 203 and a parking surface 204. The height of the magnetic disk-side inclined surface 201 increases gradually from an end portion on the magnetic disk 101 side toward the maximum lift surface 202. The maximum lift surface 202 is a surface for lifting the tab 116 to the highest position and is in parallel with the surface of the magnetic disk 101. The parking-side inclined surface 203 becomes lower gradually from the maximum lift surface 202 toward the parking surface 204. The parking surface 204 is a surface for supporting (locking) the tab 116 at a stop position (home position) and is lower than the maximum lift surface 202.

When the head 105 unloads from the data area, as described above, the actuator 106 pivots in the direction of the ramp 115 and the tab 116 slides on the sliding surface 200. First, on the sliding surface 200 the tab 116 comes into contact with the magnetic disk-side inclined surface 201 and rises on and along the inclined surface 201. After the tab 116 has gone up to the upper end of the magnetic disk-side inclined surface 201, the tab slides on the maximum lift surface 202 and then goes down along the parking-side inclined surface 203. After the tab 116 has gone down to the lower end of the parking-side inclined surface 203, it stops on the parking surface 204. Thus, when the actuator 106 is unloaded to the unloading position, the tab 116 is in contact with the parking surface 204. For loading, contrary to unloading, the tab 116 slides on the parking surface 204, parking-side inclined surface 203, maximum lift surface 202 and magnetic disk-side inclined surface 201 in this order, then leaves the sliding surface 200 and moves to a position above the magnetic disk 101.

In the above description, by way of simplification of explanation, the magnetic disk 101 is a single disk and the HDD is of a double-sided recording type, but in case of double-sided recording for plural magnetic disks, the plural magnetic disks are held integrally at predetermined spacings in the direction of the pivot shaft of the spindle motor. Suspensions each holding a recording surface scanning head are provided and are fixed to the coil support 112 through arms at positions at which they overlap the suspension 110 at predetermined spacings. The number of the suspensions corresponds to the number of the recording surfaces. Embodiments in accordance with the present invention are applicable to a HDD having a single-sided recording type magnetic disk. In such a magnetic disk, no consideration is needed for the tab on the lower surface side of the suspension and therefore it is possible to increase the bottom area of the ramp 115, thereby allowing the ramp 115 to be fixed reliably to the surface of the base 102.

Figures 4A, 4B:
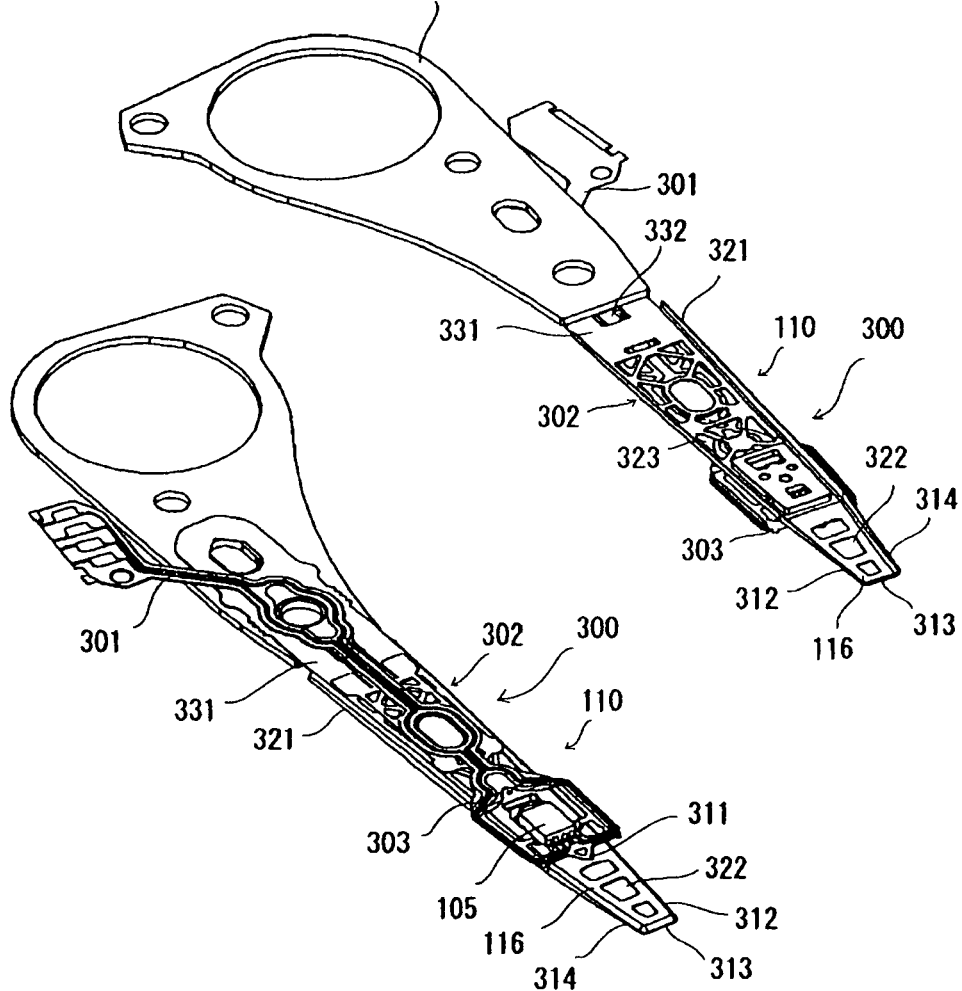
FIGS. 4(a)-(b) are exemplary perspective views of the construction of the head suspension assembly and that of the arm according to an embodiment of the present invention.

Next, a detailed description will be given about the construction of the suspension 110 used in this embodiment. FIG. 3 is a plan view showing a schematic construction of a head suspension assembly 300 and the arm 111 both used in this embodiment and FIG. 4 is a perspective view thereof. FIGS. 3(a) and 4(a) show the construction of the head suspension assembly 300 and the arm 111 as seen from the rear side opposite to the magnetic disk 101, FIGS. 3(c) and 4(b) show the construction of the head suspension assembly 300 and the arm 111 as seen from the magnetic disk 101 side, and FIG. 3(b) shows the construction of side faces of the head suspension assembly 300 and the arm 111.

In this embodiment, the head suspension assembly 300 includes plural constituent members, including the head 105, an FPC (Flexible Printed Circuit) 301 and the suspension 110. In this embodiment, the suspension 110 comprises plural constituent members, including a lead beam 302 and gimbals 303. An aperture is formed in a joined portion between the arm 111 and the suspension 110 and the load beam 302 is joined by caulking onto the surface of the arm 111 on the side opposed to the magnetic disk 101.

The FPC 301 has plural leads, which are connected respectively to connecting pads formed in the slider element portion. The FPC 301 is fixed to the gimbals 303 with use of an adhesive, but may be formed integrally with the gimbals 303.

The gimbals 303 is welded to a front portion of the load beam 302 by laser spot welding. With respect to various portions of the suspension, the "front" means the front end side (tab side) of the suspension, while the "rear" means the base side (pivot shaft side) of the suspension. A gimbals tab 311 is formed in the front portion of the gimbals 303. In the case where the gimbals tab 311 receives a shock from the external when it is retracted to the ramp 115, it comes into contact with the ramp 115, whereby it is possible to prevent damage of the head suspension assembly 300.

A tongue-like gimbals tongue (not shown) projecting toward the center of the gimbals 303 is formed in the rear portion of the gimbals tongue 311. The head 105 is fixed to the gimbals tongue with use of a low elastic epoxy resin, for example. A dimple (not shown) of the load beam 302 provides a one-point support for the gimbals tongue. The gimbals 303 is welded to the load beam 302 in a rear base portion (not shown) of the gimbals 303. The front portion of the gimbals 303 including the gimbals tongue is not welded, but is in a free state.

The load beam 302 is formed, for example, by a stainless steel plate and functions as a thin plate spring with precision. The shape of the load beam 302 is formed to be thin and light-weight and retain the required rigidity. The tab 116 is formed at the front end portion of the load beam 302 so as to project from the front end portion. The tab 116 is formed integrally with the load beam 302 and is bent and extends forward from the front end portion of the load beam 302 to the magnetic disk 101 side. With such integral formation, it is possible to prevent an increase in weight of the load beam 302 (and the suspension 110) and prevent the deterioration of dynamic characteristics.

As shown in FIG. 3(b), the load beam 302 is made up of the tab 116 and a head support portion 302a that is provided on the pivot shaft 107 side of the tab 116. The tab 116 is a portion formed for unloading the head onto the ramp, while the head support portion 302a is a portion for supporting the head exclusive of the tab 116 and lies between the tab 116 and the pivot shaft 107. For example, the portion from the base of the load beam 302 up to the bent portion for forming the tab (the portion which is bent to the magnetic disk 101 side) is the head support portion 302a and the portion from the bent portion up to the front end of the load beam 302 is the tab 116. The tab 116 and the head support portion 302a in this embodiment are formed in a continuous manner. Thus, the head support portion-side end (end side) of the tab 116 and the tab-side end (end side) of the head support portion 302a are continuous to each other at the boundary of the two.

The tab 116 is formed at the front end portion of the load beam 302. The center (axis) of the tab 116 in the pivotal direction (transverse direction) of the suspension 110 coincides with the center (axis) in the transverse direction of the tab-side end of the load beam 302. In this embodiment, the symmetrical axis of the load beam 302 and that of the tab 116 coincides with each other and, with this axis as the center, the load beam 302 and the tab 116 are formed symmetrically. During loading and unloading, this symmetrical axis serves as the axis of a torsional vibration.

Figure 10:
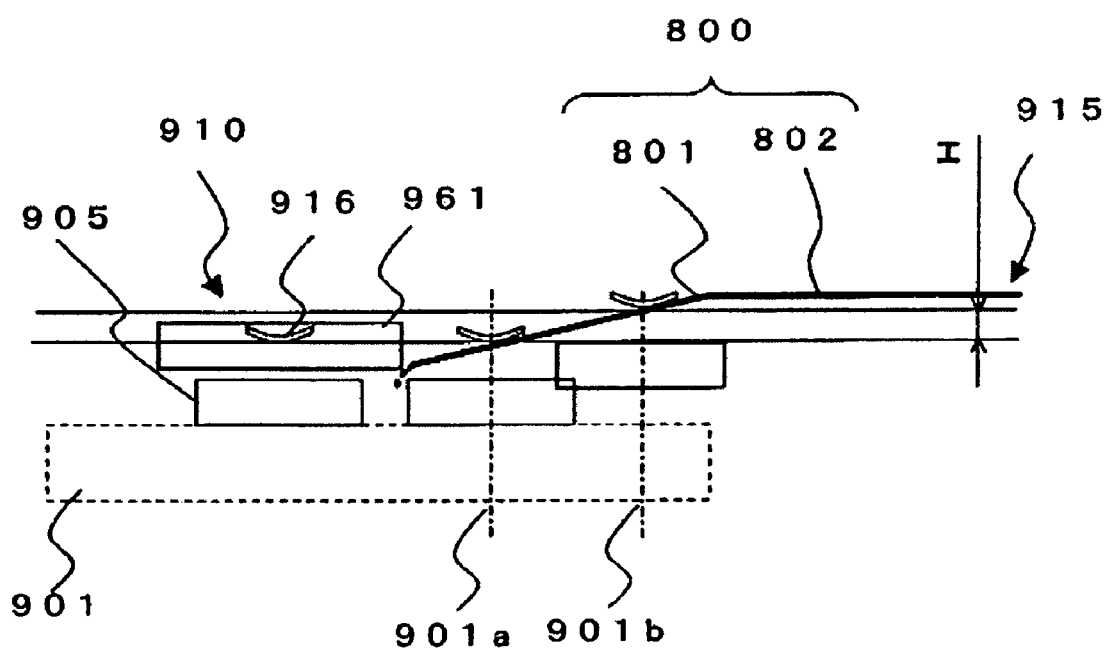
FIG. 10 is an exemplary diagram showing loading and unloading conditions of the conventional suspension.

The tab 116 is larger in width (the size in the pivotal direction) than the conventional tab shown in FIG. 10 and is also wider than the slider of the head 105. The tab 116 has sides 312, 313 and 314 at the outer periphery thereof. The sides 312 and 314 extend longitudinally toward the front end of the tab 116 and obliquely to the axis side of the tab 116 (the load beam 302) from double-sided ends of the head support portion 302a of the load beam 302.

That is, the tab 116 is in a trapezoidal shape with the width on the root side of the tab 116 being as wide as that of the front end of the heat support portion 302a of the load beam 302 and the width on the front end side of the tab 116 being narrower than that of the root side of the tab 116. More particularly, the width of the head support portion-side end of the tab 116 and the width of the tab-side end of the head support portion 302a are the same. The side 313 extending in the transverse direction is provided along the front end of the tab 116, so that the front end of the tab 116 has a predetermined width, preferably a width larger than the width of the slider of the head 105. In this embodiment, the tab 116 extends from the head support portion 302a of the load beam 302 toward the magnetic disk 101, therefore, during loading and unloading, the sliding surface 200 of the ramp 115 and the side 313 of the tab 116 come into contact with each other, while the sides 312 and 314 do not contact the sliding surface 200.

From the standpoint of rigidity, tab-ramp contact performance during sliding of the tab on the ramp 115 and machinability, it is preferable that the tab 116 be in a planar shape whose outer periphery portion is formed as a flange. However, in some embodiments of the present invention, the tab 116 may have another shape, e.g., U shape or arcuate shape.

A flange 321 is formed along both edge of the load beam 302 in the longitudinal direction of the load beam (in the direction perpendicular to the pivotal direction of the suspension 110), i.e., in the direction from the tab 116 (front side) to the arm 111 (rear side). The flange 321 is formed from a front (tab 116 side) end of a hinge portion 331 toward the front end of the load beam 302. The flange 321 is formed integrally and continuously from both edges of the load beam 302 up to the outer periphery portion of the tab 116. The hinge portion 331 is not formed with a flange, and generates an elastic force toward the magnetic disk 101 (the gimbals 303 side), thereby inducing a load on the head 105. At the center portion of the hinge portion 331, an aperture 332 is formed for reducing the weight of the load beam 302.

The flange 321 may be formed by bending the edges of the load beam 302 by press working toward the rear side opposite to the surface where the head 105 is fixed. The rigidity of the load beam 302 may be enhanced by the flange 321. In particular, in this embodiment, the flange 321 is formed on the front end side with respect to the tab 116-side end face of the head 105, i.e., from the position where the front end portion of the head 105 is located up to the front end of the tab 116. The flange of the tab 116 extends up to both ends in the pivotal direction of the head support portion 302a. Thus, the flange 321 is formed along the edges of the head support portion 302a and continuously and integrally with the outer periphery portion of the tab 116, whereby the rigidity of the load beam including the tab 116 may be further enhanced and it is possible to effectively suppress the deterioration of dynamic characteristics and rigidity of the suspension 110.

From the standpoint of rigidity, it is preferable that the flange 321 be as long as possible. Therefore, in this embodiment, the flange 321 is formed up to the tab-side end of the hinge portion 331. The tab 116 may have the flange only at its front end portion, whereby the rigidity of the tab 116 may be enhanced. In this embodiment, the front end of the tab 116 comes into contact with the ramp and the tab and slides on the ramp. Therefore, the presence of the flange at the front end portion enables the tab to slide smoothly on the ramp. For the tab 116, it is preferable that the flange be formed along the outer edge of the tab and from the front end of the tab up to the head support portion-side end of the tab.

The tab 116 is formed with plural apertures 322. With the apertures 322, it is possible to prevent an increase in weight of the tab 116 even when the width of the tab is large. By forming a plurality of the apertures 322 separately, it is also possible to prevent the deterioration in rigidity of the tab 116. Likewise, plural apertures 323 are formed in the load beam 302. With the apertures 323, it is possible not only to enhance the machinability of the load beam 302 and make the assembly of the suspension 110 efficient, but also to prevent an increase of the weight. By separating the apertures 323 in a mesh form, it is possible to enhance the rigidity of the load beam 302.

Figure 5:
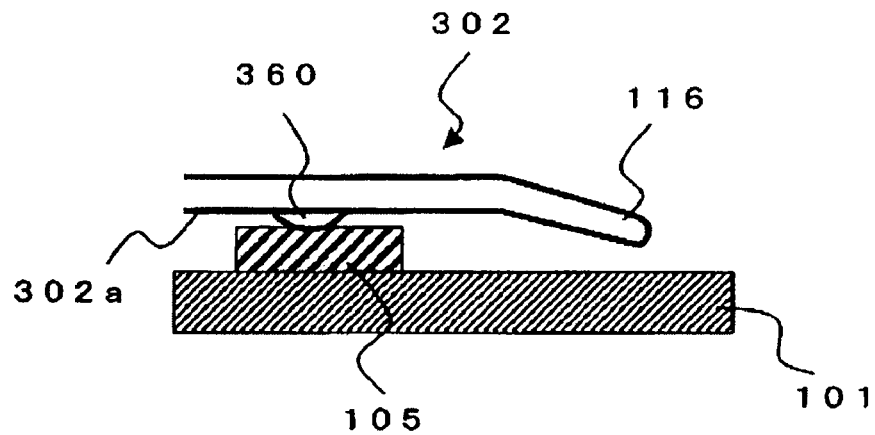
FIG. 5 is an exemplary side view showing the construction of the suspension according to an embodiment of the present invention.

FIG. 5 is a side view of the load beam 302 at the front end portion of the suspension 110, showing the state of the load beam 302 with the head 105 positioned above the magnetic disk 101. In the same figure, the FPC 301 and the gimbals 303 are not shown.

As shown in FIG. 5, the head 105 is supported at one point by a dimple 360 provided on the load beam 302 and flies over the surface of the magnetic disk 101 at a predetermined height. As described above, the tab 116 bends and extends from the front end of the head support portion 302a of the load beam 302 so as to approach the magnetic disk 101. More specifically, the tab 116 is formed in such a manner that, over the magnetic disk 101, the front end portion of the tab 116 is smaller in height than the head support portion 302a and becomes lower gradually toward the tip. In particular, the tab 116 extends in a direction different from the extending direction of the head support portion 302a. That is, the head support portion 302a is parallel to the magnetic disk 101, while the tab 116 is inclined obliquely relative to the magnetic disk 101 and the head support portion 302a.

Moreover, in this example, the tab 116 is once bent from the front end of the head support portion 302a. If the number of bending steps is small, the number of the bending processes decreases, so that the manufacture of the load beam 302 becomes easier. Contrary to the illustration of FIG. 5, even when the tab 116 is once bent from the front end of the head support portion 302a so as to become more distant from the magnetic disk 101, it is possible to manufacture the load beam 302 easily. The tab 116 may be bent plural times if the easiness of manufacture may be ensured even in such a case.

Figure 6:
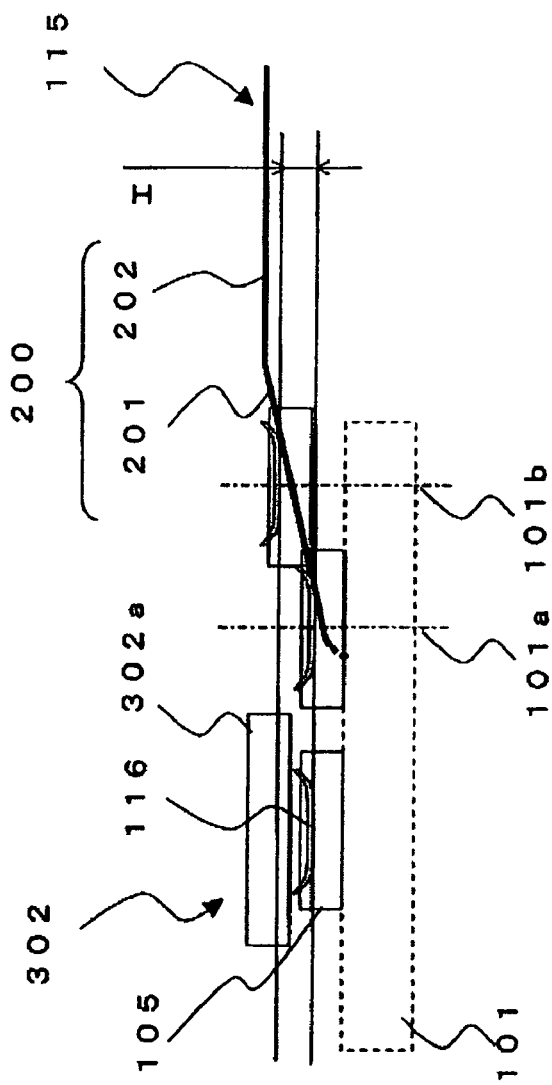
FIG. 6 is an exemplary diagram showing loading and unloading conditions of the suspension according to an embodiment of the present invention.
Figure 7:
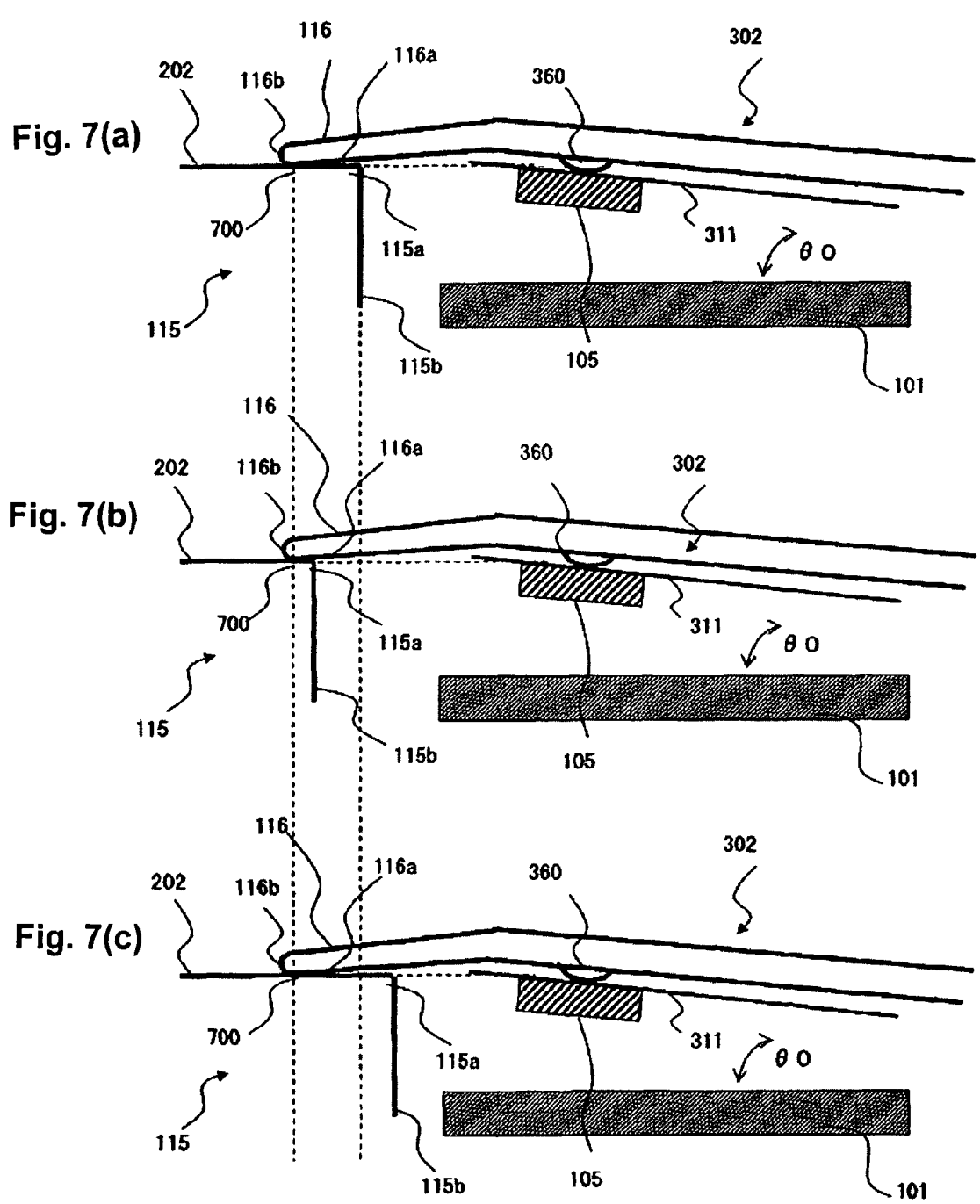
FIGS. 7(a)-(c) are exemplary diagrams showing loading and unloading conditions of the tab and a head according to an embodiment of the present invention.

FIG. 6 shows a state of the suspension during loading and unloading as seen from the front end side of the load beam 302 and FIG. 7 shows a state of the tab and the head as seen from a side face of the lead beam 302 when the tab 116 lies on the maximum lift surface 202. The same illustration may be obtained in the case where the tab lies in any one of the other surfaces of the ramp 115. During unloading, as described earlier, the tab 116 comes into contact with the magnetic disk-side inclined surface 201 of the ramp 115 and slides thereon. Then, the tab 116 lifts the load beam 302 up to a predetermined height to cause the head 105 to be separated from the magnetic disk 101, and rises up to the maximum lift surface 202.

In FIG. 6, the numeral 101a denotes a position at which the tab 116 first comes into contact with the magnetic disk-side inclined surface 201 and the numeral 101b denotes a position at which the tab 116 is lifted up to a height required to separate the head 105 from the magnetic disk 101. The height H in the figure denotes a lift quantity of the tab 116 up to the height required to separate the head 105 from the magnetic disk 101.

As shown in FIG. 7, during loading and unloading, the sliding surface 200 of the ramp 115 and the front end portion 116b of the tab 116 contact with each other and an abdominal surface 116a of the tab 116 is spaced away from the sliding surface 200 and a tab-side corner 115a of the sliding surface 200. Similarly to FIG. 11, the position and size of the ramp 115 vary due to a mechanical error. Here, consideration is given to only the ramp mounting position (in the direction of the suspension pivot shaft) without taking into account an error in the ramp height direction.

FIG. 7(a) shows the case where there is no error of the mounting position of the ramp 115, FIG. 7(b) shows the case where a side face 115b of the ramp 115 on the load beam 302 is close to the load beam 302, and FIG. 7(c) shows the case where the side face 115b is distant from the load beam 302.

In this embodiment, since the front end of the tab 116 is positioned on the magnetic disk side with respect to the head support portion 302a of the load beam 302, the front end of the tab 116 is lower than the base side and the central portion thereof (abdominal surface) when the tab slides on the ramp 115. That is, the distance from the magnetic disk 101 becomes the shortest. Therefore, in all the cases of FIGS. 7(a), 7(b) and 7(c), only the front end portion 116b of the tab 116 comes into contact with the sliding surface 200 of the ramp 115 at a contact point 700. Thus, the other portions, e.g., the abdominal surface 116a, than the front end portion 116b of the tab 116 are spaced away from the sliding surface 200 and do not contact with the same surface, and only the front end portion 116b comes into contact with the sliding surface 200. Thus, the contact point 700 does not shift and is located at a predetermined position even if an error of the mounting position of the ramp 115 occurs and the position of the side face 115b of the ramp 115 changes.

In the conventional techniques, the point of contact between the tab and the ramp shifts in the range from the closest position of the ramp and the farthest position of the ramp due to an error of the ramp mounting position. Therefore, it has previously been necessary to make the tab long so that the tab contacts with the ramp at all the positions of the ramp to match the moving contact point. In this embodiment, the position of the contact point 700 does not change. Thus, unlike the conventional techniques, it is not necessary to set the length of the tab 116 while taking into account an error of the mounting position of the tab 115, thus making it possible to shorten the tab 116.

The inclination θ0 of the load beam 302 relative to the magnetic disk 101 in a lifted state of the load beam 302 does not change in the cases of FIGS. 7(a), 7(b) and 7(c) because the contact point 700 does not shift even upon occurrence of an error of the mounting position of the ramp 115. Therefore, even when an error of the mounting position of the ramp 115 occurs, the position (101a in FIG. 6) at which the head 105 is separated from the magnetic disk 101 during unloading does not change. Therefore, the recording area of the magnetic disk does not change, either. Thus, unlike the conventional techniques, it is not necessary to narrow the recording area while taking into account an error of the ramp mounting position. Consequently, it is possible to increase the recording area.

In the conventional techniques, it has been necessary to heighten the ramp in order to ensure the recording area. In this embodiment, however, since the inclination θ0 and the lift quantity of the load beam 302 do not change even upon occurrence of an error of the mounting position of the ramp 115, it is not necessary to heighten the ramp 115 while taking into account an error of the mounting position of the ramp 115.

The inclination of the tab 116 relative to the head support portion 302a is larger than the inclination θ0 of the head support portion 302a relative to the magnetic disk 101 during loading and unloading. As shown in FIG. 7, when the tab 116 is in contact with the ramp 115, the height from the point of contact between the tab 116 and the ramp 115 to the recording surface of the magnetic disk 101 is lower than the height from the position of the head support portion 302a farthest from the recording surface of the magnetic disk to the recording surface. Therefore, only the front end portion 116b of the tab 116 comes into contact with the sliding surface 200.

The tab 116 used in this embodiment is bent to the magnetic disk side. As shown in FIG. 7, when the tab 116 lies on the maximum lift surface 202, the maximum lift surface 202 and the magnetic disk-side surface of the gimbals 301 cross each other. By bending the tab 116, it is possible to improve the rigidity of the tab.

Further, as shown in FIG. 6, the tab 116 extends at a predetermined width from the front end portion of the load beam 302 so that the cross section thereof in the pivotal direction is in a plane shape. Consequently, during unloading, the magnetic disk-side inclined surface 201 of the ramp 115 and a side portion (side 312) of the front end of the tab 116 come into contact with each other. That is, the ramp 115 contacts with a portion of the tab away from the center in the pivotal direction to the ramp side, instead of the center (the center of the load beam 302) in the pivotal direction of the tab 16.

As a result, not only the position of the head 105 when the tab 116 and the ramp 115 are in contact with each other may be closer to the central side of the magnetic disk, and the contact point 101a between the tab 116 and the ramp 115 may be closer the outside the magnetic disk. Preferably, as in FIG. 3, the size (width) in the pivotal direction of the tab 116 in this embodiment is larger than the width of the head 105 (slider). During loading and unloading, a portion of the tab 116 positioned outside the head 105 in the pivotal direction comes into contact with a inclined surface of the ramp 115. Consequently, it is possible to shorten the tab 116 and thereby enhance the rigidity thereof.

By further increasing the length of the side 312 at the front end of the tab 116, the position of the head 105 upon contact of the tab 116 with the ramp 115 may be made closer to the central side of the magnetic disk, but in this case the weight of the tab 116 increases and the impact resistance thereof is deteriorated. In this embodiment, therefore, the side 312 is made shorter than the width of the head support portion 302a of the load beam 302 to make the tab 116 trapezoidal, thereby preventing the increase in weight of the tab and improving the impact resistance thereof.

In this embodiment, the front end portion of the tab 116 is made lower than the height of the head support portion 302a in order to contact the front end portion of the tab with the sliding surface 200 of the ramp 115. When priority is given to setting the point of contact between the tab and the ramp 101a outside the magnetic disk during unloading, the height of the head support portion 302a and that of the front end portion of the tab 116 may be the same.

Figure 8:
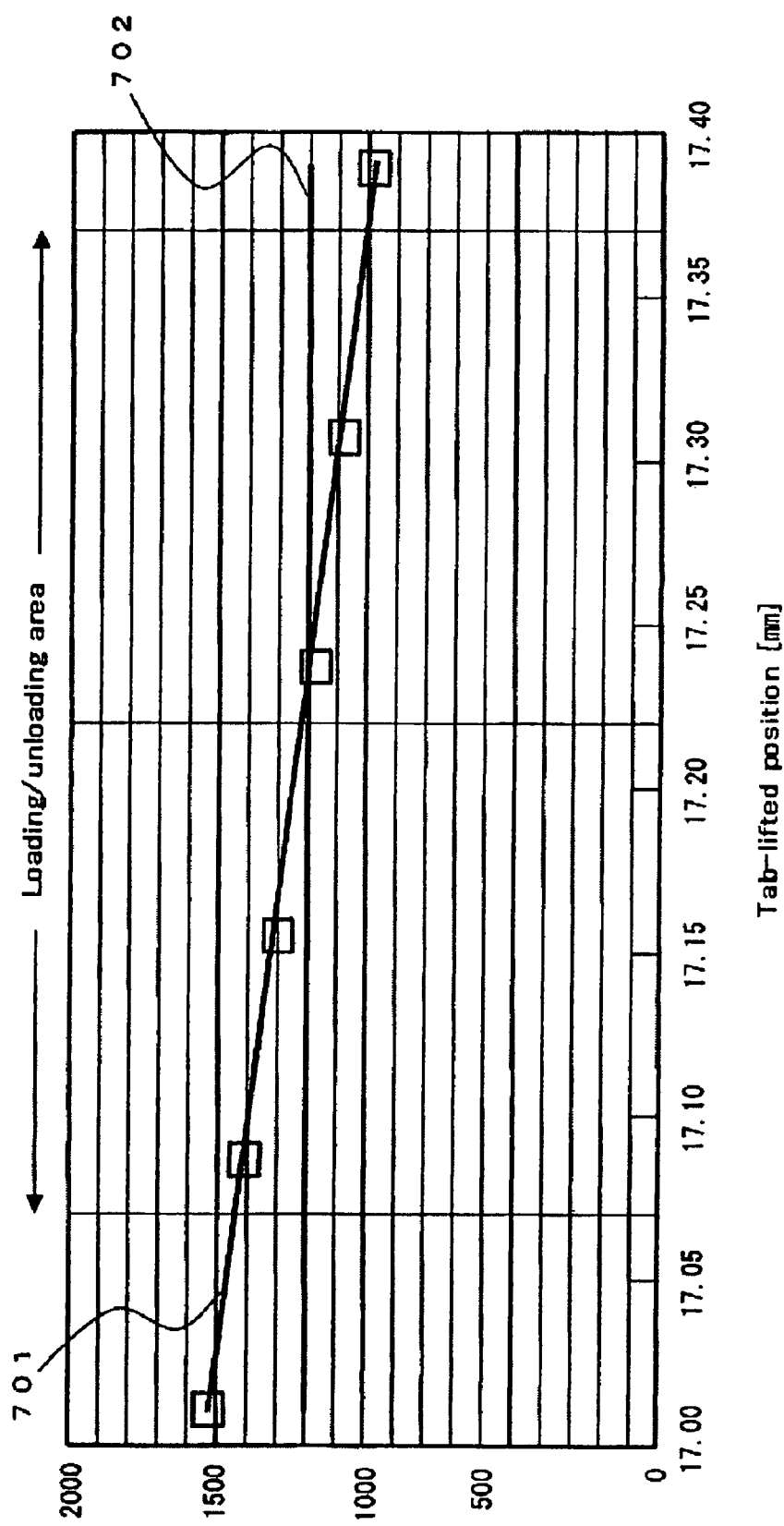
FIG. 8 is an exemplary graph showing rigidity characteristics of the tab according to an embodiment of the present invention.
Figure 9:
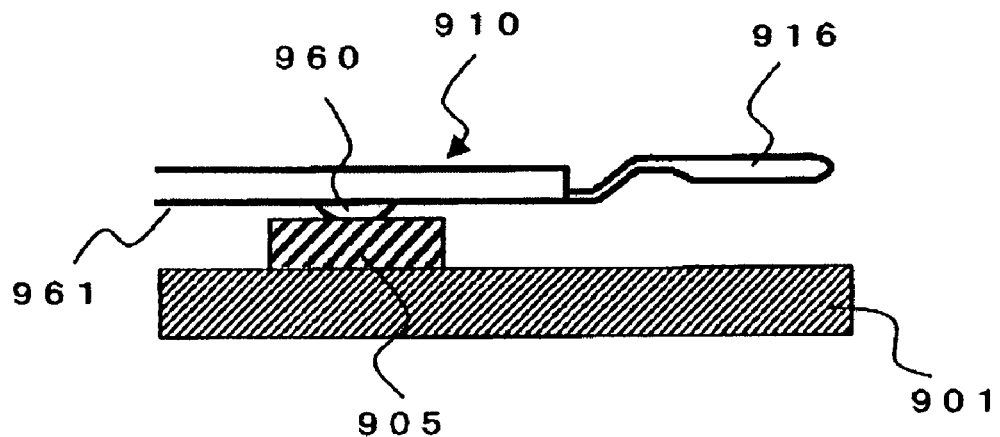
FIG. 9 is an exemplary side view showing the construction of a conventional suspension.

FIG. 8 shows the tab lift position with respect to the tab rigidity characteristics. In the same figure, a characteristic 701 represents a rigidity characteristic of the conventional tab shown in FIGS. 9 to 11, while a characteristic 702 represents a rigidity characteristic of the tab according to this embodiment. The tab lift position indicates the position at which the tab and the ramp contact with each other in the longitudinal direction of the tab during loading and unloading.

In the conventional tab, as indicated by the characteristic 701, the tab lift position changes due to an error of the ramp mounting position, so that the tab rigidity changes depending on the tab lift position. If the tab lift position is small (close to the head), the tab rigidity is large because the amount of deflection of the tab is small. If the tab lift position is large (distant from the head), the tab rigidity becomes small because the amount of deflection of the tab is large. In the conventional tab, therefore, it is necessary to take the ramp mounting position into account also with respect to the tab rigidity.

In the tab used in this embodiment, as indicated by the characteristic 702, the tab lift position does not change even upon occurrence of an error of the ramp mounting position and therefore the tab rigidity is constant. Thus, it is possible to suppress variations in the tab rigidity.

In this embodiment, as set forth above, the tab is bent to the magnetic disk side so as to contact the sliding surface of the ramp and so as not to contact a corner of the ramp during loading and unloading. As a result, the position of the point of contact between the tab and the ramp does not change and hence it is no longer required to take an error of the ramp mounting position into account. Consequently, it is possible to shorten the tab and enlarge the recording area of the magnetic disk. Besides, since the height of the ramp may be made small, it is also possible to reduce the thickness of the magnetic disk drive. Moreover, it is possible to suppress variations in the tab rigidity.

Although in the above embodiment, the tab is bent once to the magnetic disk side, no limitation is made thereto. The tab may be bent plural times insofar as the tab has a shape such that the front end portion of the tab comes into contact with the sliding surface, while the other portion than the front end portion does not contact the ramp.

The present invention is applicable not only to HDD but also to various other types of storage devices which process stored data optically. The present invention is further applicable to a data storage device provided with a read-only or write-only head.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A data storage device comprising:
    a head accessing a recording area of a medium;
    a ramp having an unloading position to which the head is unloaded from a surface of the medium; and
    an actuator pivoting around a pivot shaft to unload the head to the unloading position and load the head to a position above the surface of the medium from the unloading position;
    wherein the actuator includes a load beam having a head support portion for supporting the head and a tab provided on the side opposite to the pivot shaft with respect to the head support portion and adapted to come into contact with the ramp;
    the load beam further includes a flange formed to be bent and continuously from a front end of the tab up to both ends in the pivotal direction of the head support portion; and
    a portion offset from the center of the tab in the pivotal direction comes into contact with a inclined surface of the ramp;
    wherein the head support portion and the tab form an angle that bends the tab towards the surface of the medium.

2. A data storage device according to claim 1, wherein the head includes a slider having a head element portion, and the size in the pivotal direction of the tab is larger than the size in the pivotal direction of the slider.

3. A data storage device according to claim 1, wherein the center of the tab in the pivotal direction and the center of the tab-side end of the head support portion coincides with each other.

4. A data storage device according to claim 1, wherein the portion of the tab located near the head support portion is of the same width as the head support portion and the front end of the tab is narrower than the vicinity of the head support portion.

5. A data storage device according to claim 1, wherein the tab and the head support portion are formed contiguously, and in the contiguous portion, the size of the tab in the pivotal direction and the size of the head support portion in the pivotal direction are the same.

6. A data storage device according to claim 1, wherein the front end of the tab comes into contact with the ramp.

7. A data storage device according to claim 1, wherein when the tab is in contact with the ramp, the other portion of the tab than the front end of the tab is spaced away from the ramp.

8. A data storage device according to claim 1, wherein in the state where the tab is positioned above the surface of the medium, the tab extends to the medium side with respect to the head support portion.

9. A data storage device according to claim 1, wherein when the tab is in contact with the ramp, the height from the point of contact between the tab and the ramp to the surface of the medium is smaller than the height from a portion of the head support portion farthest from the surface of the medium to the surface of the medium.

10. A data storage device comprising:
    a head accessing a recording area of a medium;
    a ramp having an unloading position to which the head is unloaded from a surface of the medium; and
    an actuator pivoting about a pivot shaft to unload the head to the unloading position and load the head to a position above the surface of the medium from the unloading position;
    wherein the actuator includes a load beam having a head support portion for supporting the head and a tab provided on the side opposite to the pivot shaft with respect to the head support portion and adapted to come into contact with the ramp;
    the load beam further includes a flange formed to be bent and continuously from a front end of the tab up to both ends in the pivotal direction of the head support portion; and
    a portion of the tab positioned outside the head in the pivotal direction comes into contact with a inclined surface of the ramp;
    wherein the head support portion and the tab form an angle that bends the tab towards the surface of the medium.

11. A data storage device according to claim 10, wherein the center of the tab in the pivotal direction and the center of the tab-side end of the head support portion coincides with each other.

12. A data storage device according to claim 10, wherein the portion of the tab located near the head support portion is of the same width as the head support portion and the front end of the tab is narrower than the vicinity of the head support portion.

13. A data storage device according to claim 10, wherein the tab and the head support portion are formed contiguously, and in the contiguous portion, the size of the tab in the pivotal direction and the size of the head support portion in the pivotal direction are the same.

14. A data storage device according to claim 10, wherein the front end of the tab comes into contact with the ramp.

15. A data storage device according to claim 10, wherein, when the tab is in contact with the ramp, the other portion of the tab than the front end of the tab is spaced away from the ramp.

16. A data storage device according to claim 10, wherein, in the state where the tab is positioned above the surface of the medium, the tab extends to the medium side with respect to the head support portion.

17. A data storage device according to claim 10, wherein, when the tab is in contact with the ramp, the height from the point of contact between the tab and the ramp to the surface of the medium is smaller than the height from a portion of the head support portion farthest from the surface of the medium to the surface of the medium.

* * * * *